United States Patent
Bossmeyer et al.

(10) Patent No.: US 10,236,173 B2
(45) Date of Patent: Mar. 19, 2019

(54) MASS SPECTROMETER WITH LASER SYSTEM FOR PRODUCING PHOTONS OF DIFFERENT ENERGIES

(71) Applicant: Bruker Daltonik GmbH, Bremen (DE)

(72) Inventors: Jens Bossmeyer, Bremen (DE); Andreas Haase, Bremen (DE)

(\*) Notice: Subject to any disclaimer, the term of this patent is extended or adjusted under 35 U.S.C. 154(b) by 0 days.

(21) Appl. No.: 15/820,013

(22) Filed: Nov. 21, 2017

(65) Prior Publication Data

US 2018/0174815 A1 Jun. 21, 2018

(30) Foreign Application Priority Data

Dec. 20, 2016 (DE) .................. 10 2016 124 889

(51) Int. Cl.
*H01J 49/00* (2006.01)
*H01J 49/40* (2006.01)
*H01J 49/16* (2006.01)

(52) U.S. Cl.
CPC .......... *H01J 49/40* (2013.01); *H01J 49/0031* (2013.01); *H01J 49/164* (2013.01)

(58) Field of Classification Search
CPC ....... H01J 49/40; H01J 49/0031; H01J 49/164
USPC ................. 250/281, 282, 283, 288
See application file for complete search history.

(56) References Cited

U.S. PATENT DOCUMENTS

| 7,351,955 B2 | 4/2008 | Kovtoun | |
| 2007/0272849 A1* | 11/2007 | Kirihara | H01J 49/0422 250/288 |
| 2008/0169416 A1 | 7/2008 | Thompson et al. | |
| 2012/0099103 A1 | 4/2012 | Hahn | |
| 2015/0221488 A1* | 8/2015 | Hyeon | H01J 49/0009 250/282 |
| 2016/0064202 A1* | 3/2016 | VanGordon | H01J 49/0418 250/282 |
| 2017/0076930 A1* | 3/2017 | Akutsu | H01J 49/162 |
| 2017/0076932 A1 | 3/2017 | Haase | |

FOREIGN PATENT DOCUMENTS

DE 102015115416 A1 3/2017

OTHER PUBLICATIONS

Choi, Kyung Mi et al., "Characteristics of photodissociation at 193 nm of singly protonated peptides generated by matrix-assisted laser desorption ionization (MALDI)", Journal of the American Society for Mass Spectrometry, vol. 17, 2006, No. 12, S. 1643-1653.
Gorman, Greg S. et al., "Photodissociation studies of small peptide ions by fourier transform mass spectrometry", Organic Mass Spectrometry, vol. 28, 1993, No. 4, S. 437-444.
(Continued)

*Primary Examiner* — Nicole Ippolito
(74) *Attorney, Agent, or Firm* — Benoit & Côté Inc.

(57) ABSTRACT

The invention relates to mass spectrometers with optically pumped lasers, whose laser light can be used for ionization by laser desorption, for the fragmentation of ions by photodissociation (PD), for the initiation of ion reactions, and for other purposes. The invention provides a laser system for a mass spectrometer, with which at least two laser beams of different wavelengths can be generated for use at different points along an ion path from an ion source to an ion detector in the mass spectrometer.

13 Claims, 8 Drawing Sheets

(56) References Cited

OTHER PUBLICATIONS

McGivern, W. Sean et al., "Photodissociation dynamics of CH2BrCl studied using resonance enhanced multiphoton ionization (REMPI) with time-of-flight mass spectrometry." The Journal of Chemical Physics, vol. 111, 1999, No. 13, S. 5771-5779.
Moon, J. H. et al., "Construction of an Improved Tandem Time-of-flight Mass Spectrometer for Photodissociation of Ions Generated by Matrix-assisted Laser Desorption Ionization (MALDI)." Bull. Korean Chem. Soc., vol. 26, 2005, S. 763-768.
Shao, Y.L. et al., "Two-colour strong field ionization and dissociation of H2 using 780 and 390 nm femtosecond pulses." Journal of Modern Optics, vol. 43, 1996, No. 5, S. 1063-1070.
Watson, Clifford H. et al., "Laser photodissociation of gaseous ions formed by laser desorption." Analytical Chemistry, vol. 59, 1987, No. 8, S. 1133-1138.

\* cited by examiner

MASS SPECTROMETER WITH LASER SYSTEM FOR PRODUCING PHOTONS OF DIFFERENT ENERGIES

BACKGROUND OF THE INVENTION

Field of the Invention

The invention relates to mass spectrometers with pulsed or continuously emitting lasers whose laser light can be used for ionization by laser desorption, for the fragmentation of ions by photodissociation (PD), for the initiation of ion reactions, and other purposes.

Description of the Related Art

The Related Art is explained below with reference to a special aspect. This is not to be understood as a limitation, however. Useful further developments and modifications of what is known from the Related Art can also be used beyond the comparatively narrow scope of this introduction, and will easily be evident to the expert skilled in the art in this field after reading the following disclosure.

An important desorbing type of ionization for biomolecules is ionization by matrix-assisted laser desorption (MALDI), which was developed by M. Karas and K. Hillenkamp among others almost thirty years ago. MALDI ablates and ionizes the analyte molecules, preferably biomolecules, which are in highly diluted form in a mixture with molecules of a matrix substance in samples on sample supports, by bombarding them with pulses of laser light, usually pulses of ultraviolet (UV) laser light. Nitrogen lasers were previously the main type of laser for this task. Nowadays, however, the lasers used are predominantly solid-state lasers because they have a far longer lifetime and higher pulse frequencies. The lasers usually used have neodymium-doped crystals and the photon energy is tripled by non-linear crystals; for example with a target wavelength of 355 nanometers, starting from 1064 nanometers.

The ions which are created in the plasma of each pulse of laser light are, in most cases, accelerated in specially designed MALDI time-of-flight mass spectrometers (MALDI-TOF-MS) with between 20 and 30 kilovolts and axially injected into a flight path. After passing through the flight path, they encounter an ion measuring system, which measures the mass-dependent arrival time of the ions and their quantity, and then records the digitized measurements in the form of a time-of-flight spectrum. In the past, nitrogen lasers were used with repetition rates of between 20 and 60 hertz for the laser light pulses. Solid-state lasers were used with repetition rates of up to 2,000 light pulses per second. Recently, the Applicant developed a MALDI-TOF mass spectrometer with light pulse frequencies and spectral acquisition frequencies of 10 kilohertz.

An important issue in ion detection is to prevent saturation effects. To this end, the number of ions generated per pulse of laser light is usually limited, for example to a maximum of only a few thousand per pulse. A few hundred to a few thousand individual spectra are therefore summed for a time-of-flight spectrum. The mass spectra can achieve mass resolutions of $R=m/\Delta m=80,000$ and more nowadays, where $\Delta m$ is the width of the ion signal at half height.

Using suitable MALDI time-of-flight mass spectrometers, it is also possible to acquire fragment ion spectra which are generally based on a decomposition of the formed ions because of excess internal energy. These fragment ions can be post-accelerated and measured as fragment ion spectra. Unfortunately, the yield of fragment ions is low with this decomposition process. It is therefore of interest to be able to use other types of fragmentation also.

Figure 1:
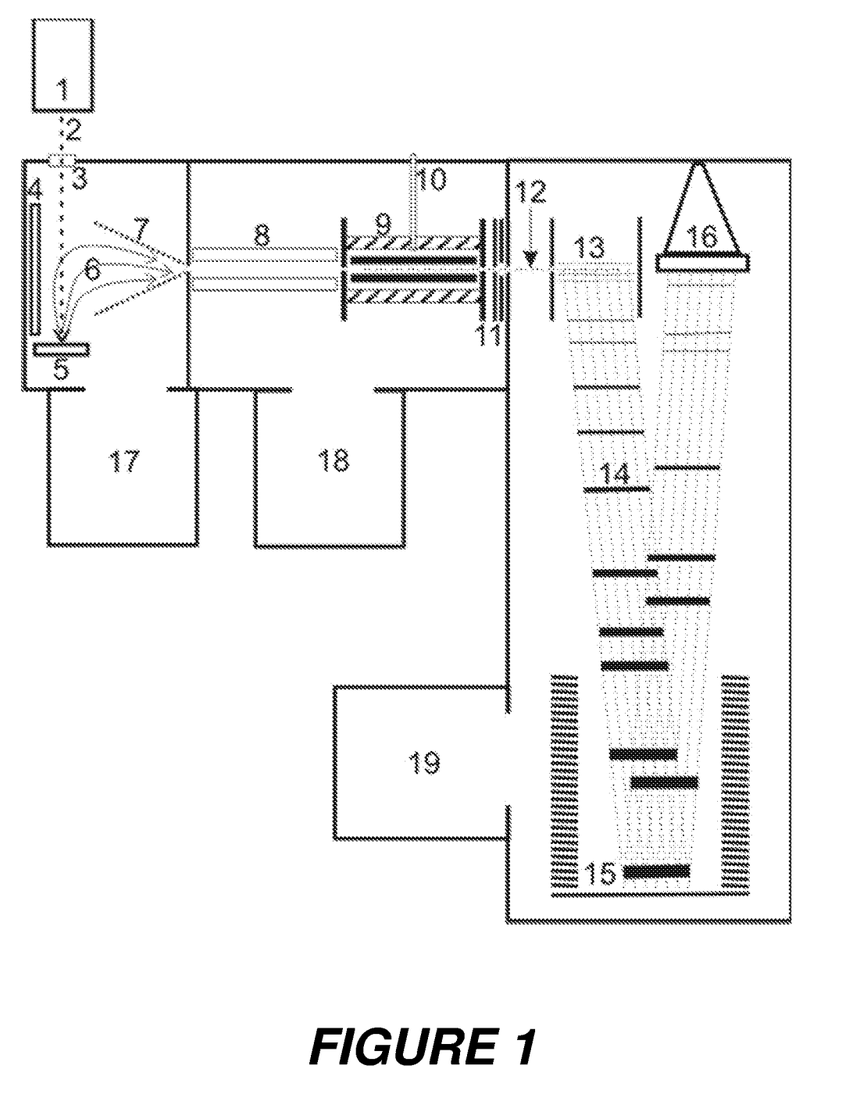
FIG. 1 shows a simplified schematic representation of a well-known time-of-flight mass spectrometer with orthogonal acceleration of the ions (OTOF) and a MALDI ion source.

A conventional type of fragmentation is collision-induced dissociation (CID), sometimes also called collision-activated dissociation (CAD), in which accelerated ions are injected into a collision cell and fragmented there by means of collisions at pressures of a collision gas, such as molecular nitrogen, of $10^{-3}$ to $10^{-1}$ pascal. A special type of time-of-flight mass spectrometer is required for this, however. FIG. 1 shows a well-known time-of-flight mass spectrometer with orthogonal acceleration of the ions ("OTOF") by a pulser. This time-of-flight mass spectrometer is equipped with a MALDI ion source and a collision cell on the ion path to the orthogonal pulser.

FIG. 1 shows a simplified schematic representation. The usual normal operating mode with temporary storage and possible collision-induced dissociation of the ions in the ion storage device (9) looks as follows: In an ion source with laser system (1), ions (6) are produced from the sample on the sample support plate (5) by the beam of pulsed laser light (2), which enters the source through a window (3), said ions then being pushed by a potential at the electrode (4) into a conventional high-frequency (RF) ion funnel (7). The ions then enter the RF quadrupole rod system (8), which can be operated both as a simple ion guide and as a mass filter to select a species of parent ion to be fragmented. The unselected or selected ions are then fed into the RF quadrupole ion storage device (9) and can be fragmented there by high-energy collisions according to their acceleration. The ion storage device (9) has a gastight casing and is charged with collision gas, such as nitrogen or argon, through the gas feeder (10) in order to focus the ions by means of collisions and to collect them in the axis.

At specified times, ions are extracted from the ion storage device (9) by the switchable extraction lens (11), which shapes the ions into a fine primary beam (12) and sends them to the ion pulser (13). The ion pulser (13) pulses out a section of the primary ion beam (12) orthogonally into the high-potential drift region, thus generating the new ion beam (14). The ion beam (14) is reflected in the reflector (15) using velocity focusing and measured in the detector (16). The mass spectrometer is evacuated by the connected pumps (17), (18) and (19).

A further type of fragmentation is photodissociation (PD). In this process, ions can be fragmented by photons, either by a single absorbed photon of sufficiently high energy (typically in the UV range) or by many photons which have to be absorbed at practically the same time (multiphoton dissociation, MPD). A separate PD laser is typically used to generate these photon beams for fragmentation, see for example Choi et al., J. Am. Soc. Mass Spectrom. 2006, 17, pp. 1643-1653; see FIG. 1 there.

Two laser systems are occasionally used in other types of mass spectrometer also, in order to both produce fragment ions. For example, Watson et al. (Anal. Chem. Vol. 59, No. 8, Apr. 15, 1987) describe the use of a pulsed $CO_2$ laser for desorption and ionization, and a continuous $CO_2$ laser for fragmentation in an ion cyclotron resonance mass spectrometer (ICR-MS); see FIG. 3 there.

The use of the laser beam of a pulsed UV laser by intermittent deflection with a mirror device, both for MALDI ionization and for the fragmentation of temporarily stored ions, has also been disclosed: see FIGS. 4(a) and 4(b) in U.S. Pat. No. 7,351,955 B2 (V. V. Kovtoun, 2005). The same beam of UV laser light with identical wavelength is used for both purposes.

The splitting of a UV pulsed laser beam to be used simultaneously for the ionization and fragmentation is furthermore known from the paper "Photodissociation Studies of Small Peptide Ions by Fourier Transform Mass Spectrometry" by G. S. Gorman and I. J. Amster (Organic Mass Spectrometry, Vol. 28, 437-444, 1993).

Furthermore, the ionization and fragmentation of the molecules of an $H_2$ molecular beam by laser photons of the two wavelengths $\omega$ and $2\omega$ (780 nanometers, 150 femtoseconds) from a Ti:SA CPA ultrashort pulsed laser with temporal offset of the beam pulse with frequency $\omega$ with respect to the beam pulse with $2\omega$, has been disclosed. The two beam pulses are, however, sent to the same point and combined there. (Y. L. Shao et al., Journal of Modern Optics, 43:5, 1063.1070; "Two-color strong-field ionization and dissociation of $H_2$ using 780 and 390 nm femtosecond pulses").

A similar arrangement, but using two pulsed lasers, one excimer and one dye laser, was used to investigate the dynamic behavior of the photodissociation of $CH_2BrCl$ (W. S. McGivern et al., J. Chem. Phys., Vol. 111, No. 13, 1999; "Photodissociation dynamics of $CH_2BrCl$").

In the field of mass spectrometry, applications with two laser systems are known for the ionization of molecules and the fragmentation of the resulting ions at different locations. Also known are applications using only one laser system to ionize molecules and fragment ions with photons of the same energy at different locations with the aid of beam splitting or moving mirror systems.

SUMMARY OF THE INVENTION

The invention provides a laser system for a mass spectrometer with which at least two laser beams of different wavelengths (or frequencies) can be generated either in pulsed form or continuously and can be guided to different points in the mass spectrometer along an ion path from an ion source to an ion detector.

In accordance with a first aspect, the invention relates to a mass spectrometer having an ion source, an ion detector, an ion path from the ion source to the ion detector, and a laser system. The laser system has an optical pump system, an optically pumped laser cell to produce primary photons, and a multiplier system to condition the primary photons to a plurality of different photon energies, at least one of these being higher than an energy of the primary photons. The laser system is designed such that the photons of different energies exiting the multiplier system are each guided to different points along the ion path.

By using only one laser system for several tasks that require laser light, the instruments are much more reasonably priced, which provides a commercial advantage. Moreover, by producing laser beams of different wavelengths, their use can be better adapted to the respective analytical task at each target location in the mass spectrometer. Each laser beam from the group of beams with different wavelengths/photon energies can be guided to an individual point on the ion path in such a way that it runs parallel to, or at least partially on, the ion path and/or crosses the ion path at any chosen angle.

The guidance to different points along the ion path in the mass spectrometer may involve guiding photons of a first energy, which are leaving the multiplier system, to the ion source in order to desorb and/or ionize and/or post-ionize molecules; for example, for MALDI ionization or modifications thereof, such as MALDESI (Matrix-assisted Laser Desorption Electrospray Ionization), or other types of ionization which require laser desorption, such as LDCI (Laser Desorption Chemical Ionization). In addition, or as an alternative, photons of a second energy exiting the multiplier system can be guided to an ion guide and/or ion storage device on the ion path in order to photodissociate ions guided or stored there. The ion guide can, for example, be designed in the form of the familiar tunnel-shaped or funnel-shaped RF stacked-ring arrangement or as an RF multipole rod assembly. Possible ion storage devices are, in particular, three-dimensional quadrupole traps and also linear or two-dimensional multipole traps.

In various embodiments, one of the photon energies can correspond to the primary photon energy after conditioning (i.e. not frequency-increased or frequency-multiplied) and another of the photon energies can be higher than the primary photon energy after conditioning; increased by a factor of two, three, four and/or five, for example. It is also possible to increase the photon energy continuously, where necessary, with the aid of an optical parametric oscillator (OPO).

The multiplier system can have a plurality of multiplier paths through which the primary photons pass in order to be conditioned to different energies. In certain embodiments, the multiplier paths can at least partially coincide spatially. A preferred embodiment is characterized by the fact that the multiplier system has a multiplier path with a plurality of multiplier crystals, and the multiplier paths branch off at different points in front of, between or behind the multiplier crystals in each case.

In various embodiments, the primary photons can be infrared (IR) photons. In the multiplier system, they can be used to form photons in the visible, near ultraviolet and/or far ultraviolet spectral region.

In various embodiments, the multiplier system can be designed to (i) simultaneously condition primary photons using a beam splitter to different photon energies and/or (ii) to condition a first sub-group of pulses from a sequence of primary photon pulses to a first photon energy, and condition another sub-group of pulses not coinciding with the first to a second photon energy (time-delayed operation).

It may prove advantageous to make photons of a specific conditioned energy which are exiting the multiplier system to pass through a delaying device before they are guided to the point along the ion path so as to arrive there at predetermined timing. Suitable applications for this measure can be found in particular in the post-ionization of molecules in laser desorption (plasma) clouds.

In accordance with a second aspect, the invention relates to a method for operating a mass spectrometer which has an ion source, an ion detector, an ion path from the ion source to the ion detector, and a laser system. A laser cell of the laser system is optically pumped to produce primary photons, and the primary photons pass through a multiplier system in order to be conditioned to a plurality of different photon energies, at least one of which is higher than an energy of the primary photons. The photons exiting the multiplier system with different photon energies are each guided to different points along the ion path.

In various embodiments, the photons of different energies emerging from the multiplier system can be used for the vaporization of solid state or liquid molecules with or without their partial ionization, ionization of gaseous molecules, initiation of ion-molecule reactions, photodissociation of ions, separation of ion clusters, desolvation of ions and/or cleaning of (electrode) surfaces along the ion path.

In the broadest sense, the present disclosure relates to mass spectrometers having pulsed or continuously emitting laser systems which preferably first generate a primary laser beam in a conventional high-performance laser crystal. At least some of the primary photons of this laser beam (it is also possible to keep a fraction at the original or primary energy) are then subjected in a multiplier system to one or more frequency multiplication stage(s) in suitable multiplier crystals, whereby photons of higher and higher energy are formed step-by-step, starting with at least a portion of the primary photons.

The present disclosure now proposes to draw off laser light with differently conditioned photon energies from the multiplier system and to use it for different tasks, especially ion handling tasks, at different, spatially separate points along an ion path from an ion source to an ion detector in the mass spectrometer. Photons with optimally adapted energy in each case can then be used for each of the different tasks, for example for the ionization of a material or the fragmentation of ions. The equipment needed to provide an additional laser system to deal with additional tasks, as is known from the Related Art, can be saved and be replaced by much less costly multiplier stages.

Usually, infrared beams are produced in the primary high-performance laser crystal, for example infrared beams with a wavelength of around 1064 nanometers in Nd:YAG or similar crystals. In downstream multiplication stages, photons with 532 nanometers (green; doubling), 355 nanometers (UV; tripling) and 213 nanometers (UV; quintupling), or with 532 nanometers (green; doubling) and 266 nanometers (UV; quadrupling) can be produced one after the other, for example. It is then possible, for example, to optimally ionize a MALDI sample with photons of 355 nanometers (3.49 eV) by using crystallized matrix substances such as 2,5-dihydroxybenzoic acid, sinapic acid (SA) or α-cyano-4-hydroxy-cinnamic acid, to guide or store the ions in an RF voltage-operated ion guide or temporary storage device, and to optimally fragment them there with photons of 266 or 213 nanometers (4.66 eV or 5.82 eV), for example.

In other embodiments, the primary infrared radiation (1064 nanometers; 1.17 eV) can be used for the ionization of a sample by infrared MALDI, for example; the ions can then be photodissociated relatively gently in downstream components along the ion path by photons with 266 nanometer wavelength (4.66 eV; quadrupling) formed from the infrared primary photons. The present disclosure facilitates a great variety of reaction combinations in mass spectrometers, which, for example, comprise pure vaporization of a sample, ionization of the vapor molecules, ionization by matrix-assisted laser desorption (MALDI), initiation of reactions of the ions with neutral molecules, decomposition of complex ions, stripping of solvate sheaths, fragmentation of ions and/or cleaning of (electrode) surfaces along the ion path to the degree desired.

BRIEF DESCRIPTION OF THE DRAWINGS

The invention can be better understood by referring to the following illustrations. The elements in the illustrations are not necessarily to scale, but are intended primarily to illustrate the principles of the invention (mainly schematically). In the illustrations, the same reference numbers designate corresponding elements in the different views.

DETAILED DESCRIPTION

While the invention has been illustrated and explained with reference to a number of different embodiments thereof, those skilled in the art will recognize that various changes in form and detail may be made therein without departing from the scope of the technical teaching as defined in the appended claims.

In the broadest sense, the invention relates to mass spectrometers with pulsed or continuously emitting laser systems which typically first generate a primary beam in a high-performance laser crystal. At least some of the primary photons of this beam (it is also possible to keep a proportion at the original or primary energy) are then subjected in a multiplier system to one or more frequency multiplication stage(s) in suitable multiplier crystals, whereby photons with higher and higher energy are formed step-by-step, starting with at least a portion of the primary photons.

The present disclosure now proposes to draw off laser light with differently conditioned photon energies from the multiplier system and use it for different tasks, especially ion handling tasks, at different points along an ion path from an ion source to an ion detector in the mass spectrometer. For the different tasks, for example the ionization of a solid material, the ionization of a gas, the separation of complex ions, the separation of water molecules attached to ions (desolvation), the induction of ion/molecule reactions, the fragmentation of ions and/or the cleaning of (electrode) surfaces along the ion path, conditioned photons with suitably selected and adapted energy can be used.

The multiplier crystals are preferably operated with very high photon densities. Therefore, the laser beams drawn off from the multiplier system are generally so intense that they are preferably attenuated in appropriate attenuators to the intensity which is suitable or optimal for the particular application. The attenuation required can amount to three to five orders of magnitude in certain cases.

The invention obviates the need to use a second laser system with a high-performance laser crystal, optical pump system and its supply electronics, which make up the main cost of such a system. Modern mass spectrometers can work in pulsed operation with light pulse frequencies of up to ten kilohertz and more; the requisite high-power instruments for the electrical supply, particularly the supply for the optical pump units, are therefore costly and offer significant potential for cost savings.

Figure 2:
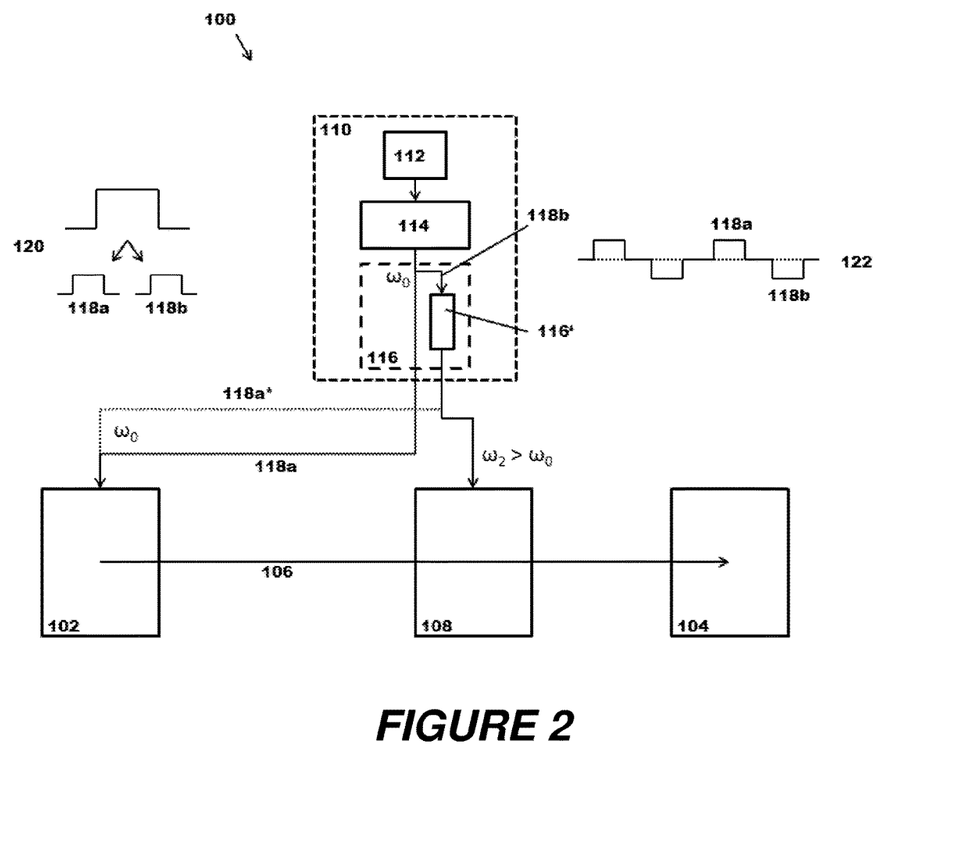
FIG. 2 depicts a schematic diagram of an arrangement for a mass spectrometer according to the principles of the present disclosure.

FIG. 2 depicts a schematic diagram of a mass spectrometer (100) according to the principles of the present disclosure. It contains an ion source (102), an ion detector (104), and an ion path (106) connecting these components. An ion optical component (108) such as an RF ion guide or an RF ion storage device can be located on the ion path (106) as shown, and acts on the ions at least part of the time on their path (106) from ion source (102) to detector (104).

The mass spectrometer (100) furthermore contains a laser system (110) which has a pump light source (112), for instance a pump laser, a laser-active medium (114) such as a solid-state laser crystal with resonator, and a multiplier system (116). The operation of the pump laser (112) leads to the necessary population inversion in the laser-active medium (114) so that it can emit laser light pulses with primary photons of a specific energy $\omega_0$, preferably at a constant pulse rate. In the example presented, the multiplier system (116) has a multiplier path (116') with a frequency-multiplying crystal (or a plurality of them in series), which converts and in particular increases the energy of the primary photons $\omega_0$.

In the embodiment shown, the light beam of primary photons is divided on entering the multiplier system (116). A first beam (118a) is guided to the ion source (102) without any further conversion, so that, for example, when the initial energies $\omega_0$ correspond to the infrared spectral region, the primary photons can be used for IR-MALDI of a prepared molecular sample, with 4-nitroaniline as the matrix substance, for instance. The other beam (118b) passes through the multiplier path (116') so that photons with higher energy $\omega_2$ emerge at its end. The multiplication here can be a frequency doubling, tripling, quadrupling or even quintupling, depending on the choice and arrangement of the nonlinear crystals, which in the case of incoming IR photons can lead to exiting photons in the visible, near UV or far UV region. This second beam (118b) can be sent to the ion guide/ion storage device (108) in order to manipulate ions guided or stored there, for example to photodissociate them.

In an alternative variant and in the example embodiment shown, it is possible to exploit the fact that not all photons with the original energy $\omega_0$ are used up in the multiplier crystals, but that certain proportions pass through without frequency conversion. Instead of dividing photons with the original energy $\omega_0$ when they enter the multiplier system (116), the photons exiting the multiplier path (116') can be divided using wavelength-sensitive beam splitters and fed to their spatially separate locations of use along the ion path, as is indicated with the dashed outline (118a*).

The dividing of the beam of primary photons onto different light paths can basically be executed by a simple beam splitter sending a certain portion of the flow of primary photons to the ion source (102) and the frequency-converted complementary portion simultaneously via the multiplier path (116') to the ion guide/ion storage device (108); for example, in the ratio 1:1; see pulse splitting schematically indicated at (120). The converted photons with higher energy $\omega_2$ thus bring about the dissociation of ions which have been produced by previous laser pulses in the ion source (102).

In addition, or as an alternative, it is also possible to exploit a possibly provided pulse character of the primary photon parcels and to send each of them in their entirety alternately to ion source (102) and to the multiplier path (116'); see pulse change schematically indicated at (122). With the appropriate coordination of the pulse lengths and pulse intervals, the ions produced in the source (102) by a first laser pulse without frequency conversion can use the interval between pulses to get from the source (102) to the ion guide/ion storage device (108) and be photodissociated there by a subsequent laser pulse. This change in light path can be switched with a triple-state Pockels cell in the laser resonator, for example, as has been described in the patent application US 2017/0076932 A1 (corresponds to GB 2 542 500 A and DE 10 2015 115 416 A1) of the Applicant, by adjusting the polarization of the laser radiation formed. It will be understood that the sequence of pulse changes does not have to be strictly alternating, but can have a more complicated pulse change schematic; for example, it is possible to send only every n-th laser pulse (n>2) to the ion guide/ion storage device (108) via the multiplier path (116') so that the higher rate of ionization pulses allows sufficient ions to be produced for the photodissociation or other ion manipulation.

In addition to a pulsed laser, as has been described above, it is also possible to use a continuous wave laser, if this is advantageous for an application in the mass spectrometer. Pulsed partial beams (i.e., energy-modulated partial beams) can be generated from a continuous wave laser beam as well, for example by periodically switching a beam splitter on and off.

Figure 3A:
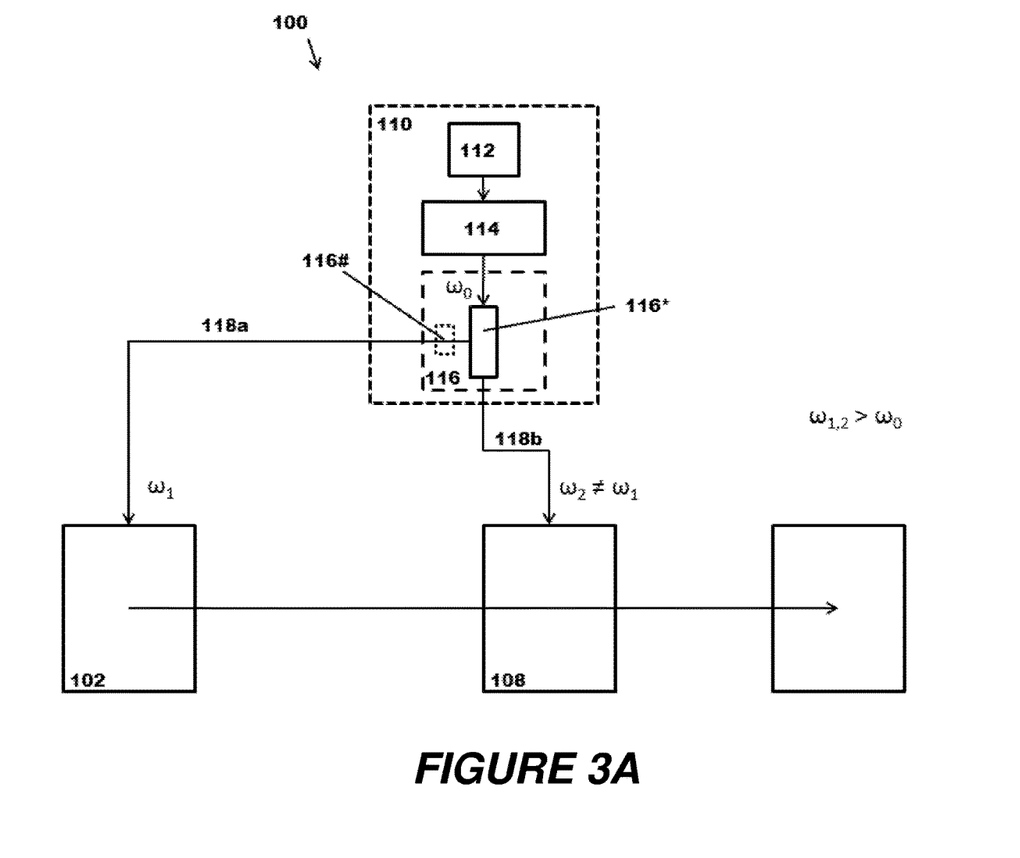
FIG. 3A depicts an example of a mass spectrometer and the setup of a pulsed laser according to the principles of the present disclosure.

FIG. 3A shows a modification of a mass spectrometer (100) with a laser system (110) according to the principles of the present disclosure. To avoid repetitions, the discussion below concentrates mainly on the differences to the previous example embodiments. As before, the laser system (110) has a pump light source (112), a laser-active medium (114), and a multiplier system (116), which in this embodiment has a multiplier path (116*). In this example, however, two different photon energies $\omega_1$, $\omega_2$ are drawn off from the multiplier system (116); these energies do not correspond to the original energy $\omega_0$, but are both frequency-converted as they pass through the multiplier system (116).

In the illustration, photons are branched off at different points on the multiplier path (116*) to form different beams (118a, 118b) (and consequently on different, but sometimes spatially coinciding paths). The photons guided to the ion guide/ion storage device (108) have passed through the entire multiplier path (116*) and thus have undergone a stronger frequency conversion than the photons guided to the ion source (102). An original wavelength of 1064 nanometers for the primary photons produced in the laser-active medium (114) may serve as an example, where the photons are tripled on the multiplier path (116*) to 355 nanometers and are then branched off in order to induce UV-MALDI in the ion source (102), whereas photons which pass through the entire multiplier path (116*) and corresponding quintupling to 213 nanometers photodissociate ions which are in the ion guide/ion storage device (108). It is to be understood that the photons which have already been frequency-converted in the first section of the multiplier path (116*) and then branched off to form beam (118a) can optionally pass through further multiplier stages in the multiplier system (116), as are indicated by a dashed outline at (116#).

Figure 3B:
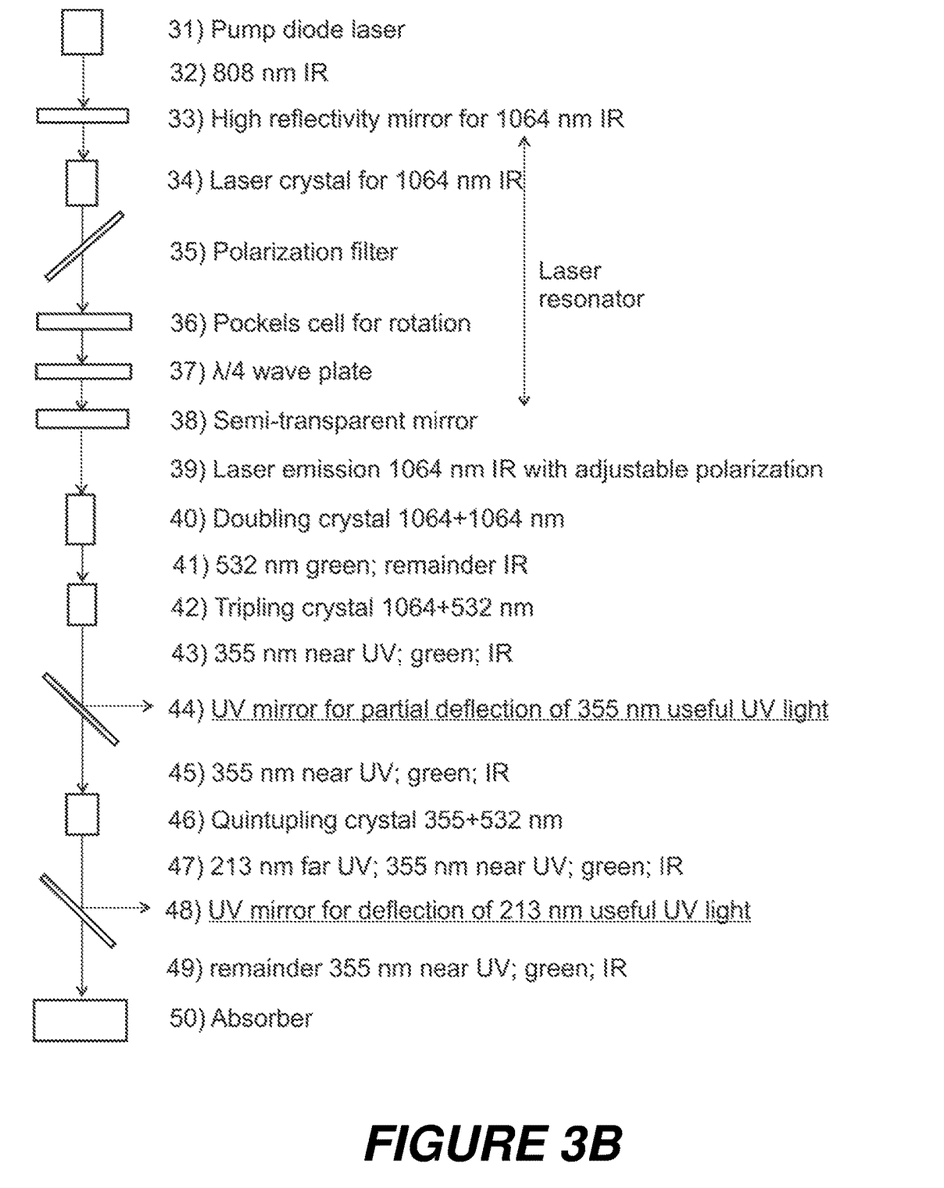
FIG. 3B shows a simplified schematic representation for the arrangement of a pulsed laser system that may be used in the mass spectrometer from FIG. 3A.

FIG. 3B shows, as an example, a greatly simplified schematic representation for the arrangement of a pulsed laser system in the mass spectrometer from FIG. 3A which in this example produces UV light pulses with 355 nanometers for MALDI ionization, and UV light pulses of 213 nanometers for an effective fragmentation. A pump-diode laser (31) with 808 nanometer IR light pumps the laser crystal (34). The mirror (33) is highly transparent to 808 nanometer IR light and highly reflective for the 1064 nanometer IR light of the laser. The laser resonator is terminated by a mirror (38), which is semi-transparent here. The laser resonator also contains a Pockels cell (36) and a $\lambda/4$ wave plate (37), which together form a switchable polarization rotator, and a polarization filter (35). If the polarization rotator (36, 37) is switched so that the polarization coincides with the transmission direction of the polarization filter (35), light can pass to and fro unhindered between the mirrors (33) and (38), and the light amplification process commences. Its light intensity increases exponentially very rapidly in fractions of nanoseconds until the population excess in the upper level of the laser crystal is exhausted (Q-switching).

The IR light pulse of a few nanoseconds duration exiting through the semi-transparent mirror (38) is linearly polarized in a fixed direction. In the doubling crystal (40), green photons (532 nanometers; 2.33 eV) are produced from two IR photons (1.17 eV energy per photon) in each case; in the tripling crystal (42), photons are similarly produced in the near UV (355 nanometers; 3.49 eV) from the IR photons and green photons. The UV mirror (44) diverts a portion of the useful UV radiation to the MALDI ionization in the ion source. In a quintupling crystal (46), a photon with 355 nanometers and a photon with 532 nanometers produce a new photon with a wavelength of 213 nanometers (far UV; 5.82 eV). These new photons are deflected by the UV mirror (48) and guided to the fragmentation point in the ion guide/ion storage device. The remaining light (49) is captured in an absorber (50) and eliminated.

Figure 3C:
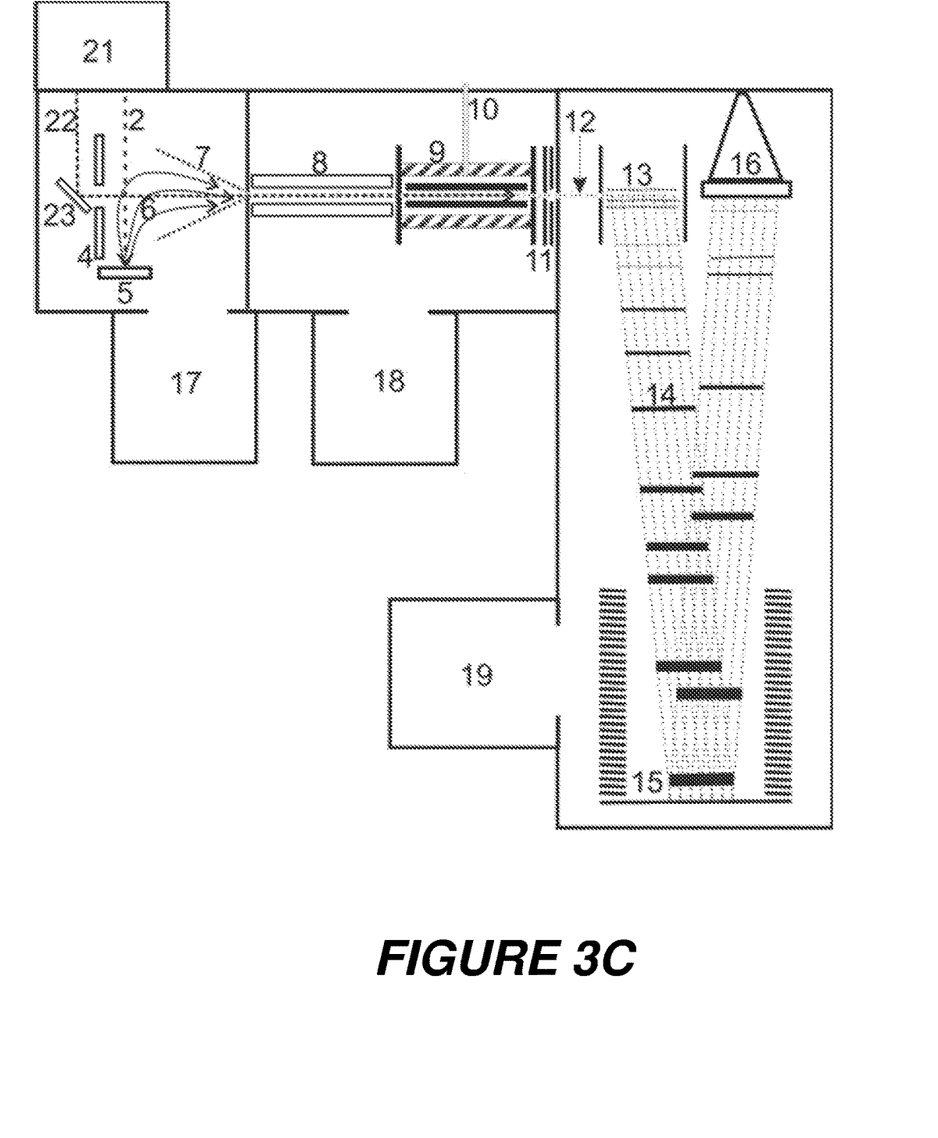
FIG. 3C depicts a schematic representation for a time-of-flight mass spectrometer that uses a pulsed laser according to the principles of the invention.

An example of a time-of-flight mass spectrometer with such a design is shown in FIG. 3C for illustration. A laser system (21) according to principles of this disclosure generates two laser beams (2) and (22). The laser beam (2) with exemplary 355 nanometer wavelength produces ions of the sample on the sample support plate (5) by a MALDI process; the laser beam (22) with 213 nanometer wavelength, for example, fragments the ions in the ion storage device (9).

It is to be noted here that the schematic set-up of FIG. 3B is greatly simplified. All lenses for focusing the beams have been omitted, for example. By moving the lenses in the direction of the beam, they can be set so that the optimal photon densities in each case are generated in the multiplier crystals by beam focusing. In the doubling crystal (40), it is possible to achieve a situation where more than 80% of the infrared photons are used up. This is not favorable here, however, because a high density of infrared photons is still required in the tripling crystal (42). The setting of optimal photon densities is well-known to those skilled in the art.

The person skilled in the art also routinely sets the fractions for partial deflections of the useful laser beams. The mirror (44) only needs to deflect a very small portion of the 355 nanometer photons because only around one thousandth of the UV beam energy, relative to 100 microjoule starting energy, produced in the tripling crystal is required for MALDI. As a rule, the deflected beam even has to be further attenuated with an adjustable attenuator. The attenuators are also not shown here for reasons of clarity.

The invention facilitates very different combinations of laser beams with optimum photon energies in each case for various applications in the mass spectrometer. The beams can be used purely to vaporize a sample, or to ionize the vapor molecules, or to initiate reactions of ions with neutral molecules, or to fragment ions to desired degrees. The separation of heavy complex ions, removal of water molecules appended to ions (desolvation), or cleaning of (electrode) surfaces along the ion path are also possible by means of photons with suitable energy.

It is to be noted here that the arrangement of polarization filter (35), Pockels cell (36) and λ/4 wave plate (37) allows light pulses to be omitted without interrupting the clock rate for the primary crystal (34). To achieve this, the polarization is rotated through 90° by inversion of the Pockels cell voltage, and the emerging light beam can pass through the multiplier crystal unhindered, without its frequency being converted to any noticeable extent (three-state Pockels cell operation). All IR light is then eliminated in the absorber (50). The purpose and detailed mode of operation are described in the patent application US 2017/0076932 A1 (corresponds to GB 2 542 500 A and DE 10 2015 115 416 A1), which is incorporated herein by reference in its entirety.

Similarly, the multiplication in the last multiplier crystal (46) can also be prevented for selected laser pulses by means of a Pockels cell in front of the multiplier crystal (46), which provides the option to rotate the polarization plane for one of the wavelengths involved through 90° and to allow the light beam to pass through the multiplier crystal (46) without being affected. This allows fragmentation in the ion storage device (9) of FIG. 3C to easily be switched off, for example. The polarization setting of the primary photons can also be used to realize in practice a beam path of the primary photons such as the one indicated with the dashed outline (118a*) in FIG. 2, namely passing through the multiplier path (116'), but without being frequency-converted, since the multiplier crystals do not respond to certain polarization states.

Furthermore, it is to be noted here that it can be advantageous if the pulses of at least one of the two laser beams drawn off from the laser system pass through a delaying device, for example an extended beam path in a multiple reflection cell, in order to arrive at the location of use at an optimal, predetermined timing.

Figure 4:
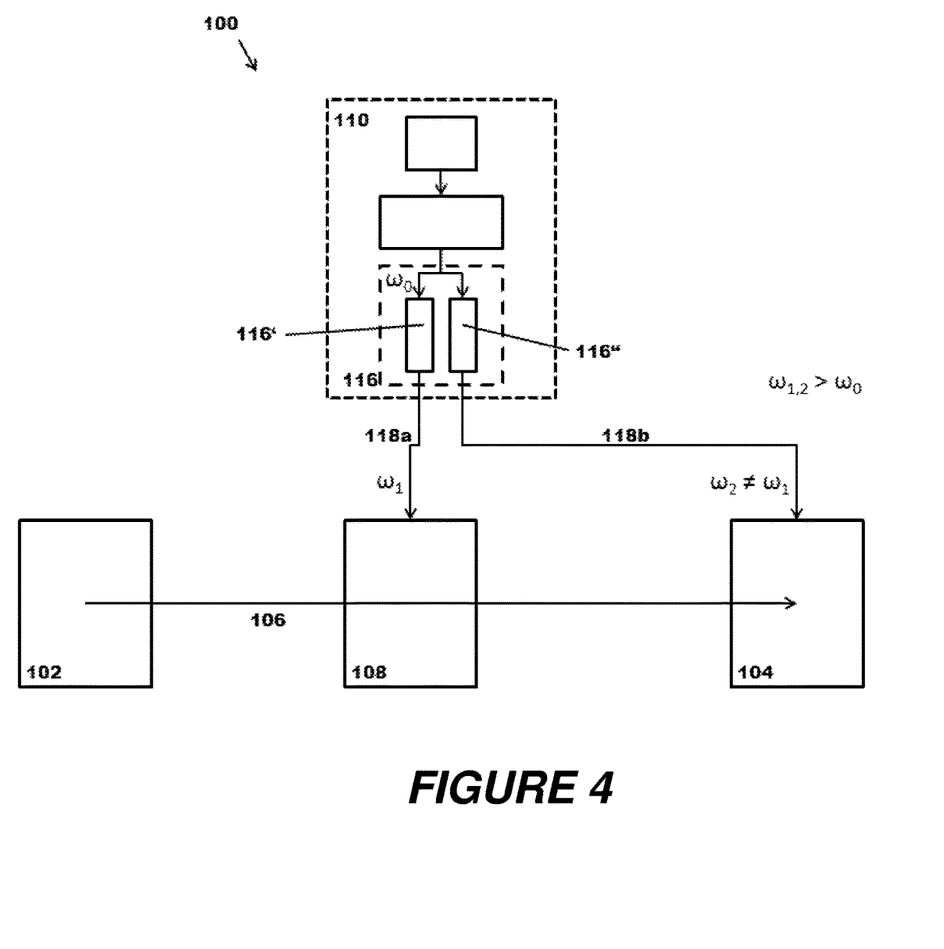
FIG. 4 depicts a further embodiment of a mass spectrometer according to the principles of the present disclosure.

FIG. 4 shows a schematic representation of a further modification of a mass spectrometer (100) with a laser system (110) according to the principles of the present disclosure. To avoid repetitions, the discussion here again concentrates mainly on the differences to the previous example embodiments. A key difference is that the primary photons of the original energy $\omega_0$ are divided as they enter the multiplier system (116) (simultaneously by means of a beam splitter or alternating by pulse groups) and pass through two different multiplier paths (116', 116"), on which they are conditioned to different photon energies $\omega_1$, $\omega_2$, for example using different multiplier crystal arrangements. Starting from an initial energy $\omega_0$ corresponding to 1064 nanometers, the first section (116') can, for example, produce photons with 266 nanometers, and the second section (116") photons with 213 nanometers for use at different points along the ion path (106).

FIG. 4 illustrates the versatility of the devices and methods proposed here such that the photons emerging from the multiplier system (116) with different energies $\omega_1$, $\omega_2$ can be used for purposes other than the ionization in the ion source (102), which can be executed in these embodiments by means of known methods, such as electrospray ionization, electron impact ionization, or glow discharge ionization. A first beam (118a) with photons conditioned to an energy $\omega_1$ is sent as described previously to an ion guide/ion storage device (108) on the ion path (106), for example to remove solvate sheaths from ions, whereas a second beam (118b) with photons conditioned to a different energy ω2 is guided to the ion detector (104). In this embodiment, the ion detector (104) can be an ion cyclotron resonance cell, for example, as is used for Fourier transform mass spectrometry, and which combines mass analyzer and detector in one component. The laser light of beam (118b) can be used for the photodissociation of ions stored in the magnetic field of the cell, for example.

Figure 5:
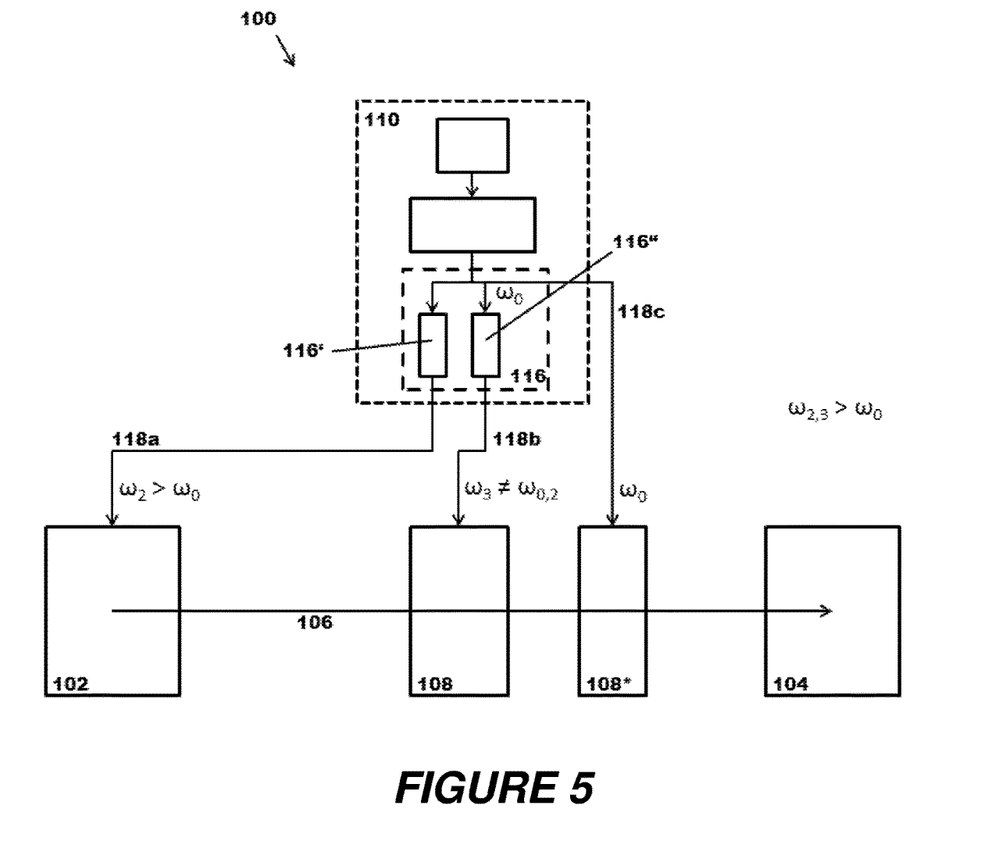
FIG. 5 illustrates schematically yet another embodiment of a mass spectrometer with a laser system according to the principles of the present invention.

FIG. 5 illustrates schematically a further modification of a mass spectrometer (100) with a laser system (110) according to the principles of the present disclosure. The multiplier system (116) is designed here such that three different beams (118a, 118b, 118c) of different photon energies $\omega_0$, $\omega_2$, $\omega_3$ can be drawn off and fed to three spatially separate locations of use along the ion path (106); in the example shown, these locations are the ion source (102), an ion guide/ion storage device (108), and a further component (108*) on the ion path (106), which can be similarly designed as an ion guide/ion storage device for the purpose of tandem fragmentation, for example, in which photodissociation fragment ions produced in the first guide/storage device (108) are further fragmented with laser light of different wavelength. This second photodissociation can be conducted with a wavelength corresponding to the original energy $\omega_0$; for example by means of IR multiphoton dissociation (IRMPD) if the original energy $\omega_0$ originates from the IR region.

The multiplier system (116), moreover, has two multiplier paths (116', 116") of different designs. The laser beam of original energy $\omega_0$ is branched off shortly after entering the multiplier system (116) and guided to component (108*). Simultaneously and/or staggered pulse group by pulse group, the laser light passes through the two multiplier paths (116', 116"), and is deflected with correspondingly increased energy $\omega_2$, $\omega_3$ to the ion source (102) (for example for the purpose of UV desorption) or to the ion guide/ion storage device (108).

Figure 6:
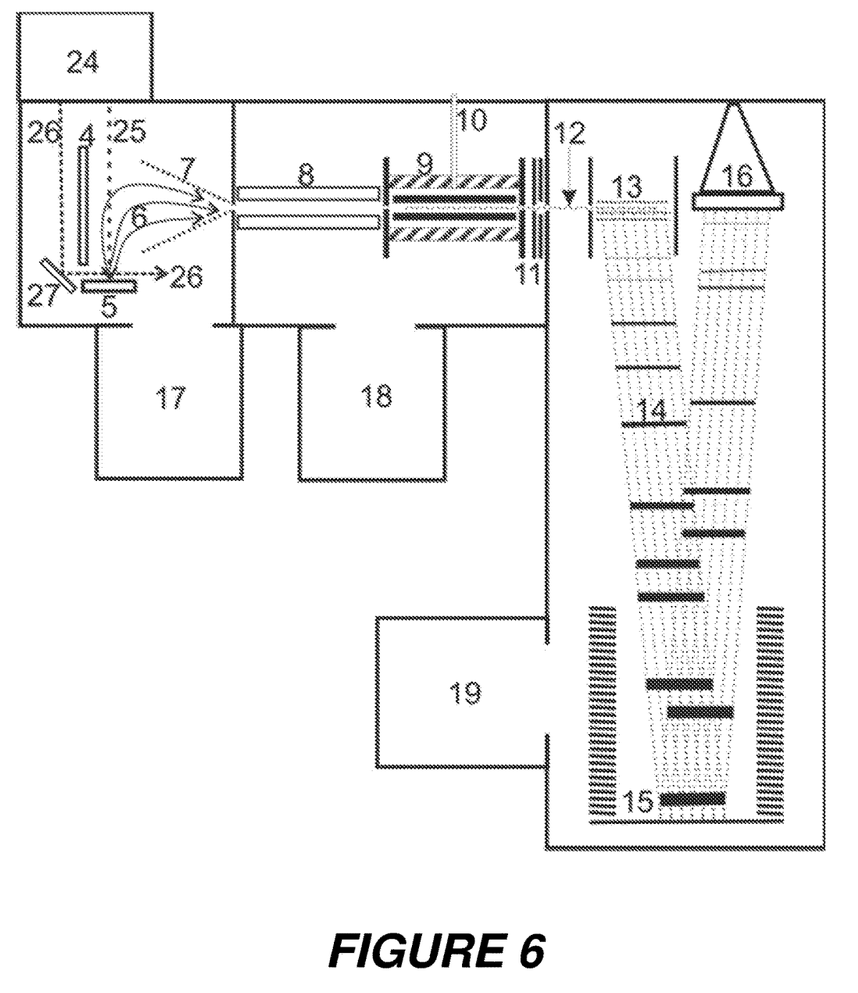
FIG. 6 depicts schematically a variation of a time-of-flight mass spectrometer according to the principles of the present disclosure.

In a further embodiment, the example design scheme from FIG. 3C can be modified to produce pairs of beams to be used for other purposes in the mass spectrometer. For example, as depicted in the mass spectrometer of FIG. 6, primary infrared radiation (1064 nm; 1.17 eV) can be used as a beam (25) for vaporization of the sample on the sample support (5) and weak ionization by infrared MALDI, and the vaporized, hot sample molecules can then be post-ionized directly above the sample on the sample support (5) by the second laser beam (26), for example with photons of 266 nanometer (4.68 eV; quadrupling). The frequency quadrupling of the IR photons can be carried out in two steps, doubling and quadrupling, in the multiplier system. The temporal offset between the laser beams (25, 26) with simultaneous extraction of the beams from the multiplier system can be achieved by, for example, extending the light path of the beam (26) used for the post-ionization; in a multiple reflection cell, for example. As a rough estimate, for each extension of the path by 30 centimeters, there is a delay of approximately one nanosecond (in vacuo).

The invention has been described above with reference to different, specific example embodiments. It is understood, however, that various aspects or details of the embodiments described can be modified without deviating from the scope of the invention. In particular, characteristics and measures disclosed in connection with different embodiments can be combined as desired if this appears practicable to a person skilled in the art. In addition, the above description serves only as an illustration of the invention and not as a limitation of the scope of protection, which is exclusively defined by the enclosed Claims, taking into account any equivalents as the case may be.

The invention claimed is:

1. Mass spectrometer having an ion source, an ion detector, an ion path from the ion source to the ion detector, and a laser system which comprises an optical pump system, an optically pumped laser cell to produce primary photons, and a multiplier system to condition the primary photons to a plurality of different photon energies, at least one of which is higher than an energy of the primary photons, wherein the laser system is designed such that the photons of different energies exiting the multiplier system are each guided to different points along the ion path.

2. The mass spectrometer according to claim 1, wherein photons of a first energy which exit the multiplier system are guided to the ion source to at least one of desorb, ionize and post-ionize molecules.

3. The mass spectrometer according to claim 1, wherein photons of a second energy which exit the multiplier system are guided to at least one of an ion guide and ion storage device on the ion path, in order to photodissociate ions guided or stored there.

4. The mass spectrometer according to claim 1, wherein one of the photon energies after the conditioning corresponds to the primary photon energy, and another one of the photon energies after the conditioning is higher than the primary photon energy.

5. The mass spectrometer according to claim 1, wherein the multiplier system has a plurality of multiplier paths through which the primary photons pass in order to be conditioned to different energies.

6. The mass spectrometer according to claim 5, wherein the multiplier paths at least partially coincide spatially.

7. The mass spectrometer according to claim 6, wherein the multiplier system has a multiplier path with a plurality of multiplier crystals, and the multiplier paths each branch off at different points in front of, between or behind the multiplier crystals.

8. The mass spectrometer according to claim 1, wherein the primary photons are infrared photons.

9. The mass spectrometer according to claim 8, wherein the multiplier system is designed to produce photons in at least one of the visible, near ultraviolet and far ultraviolet spectral region.

10. The mass spectrometer according to claim 1, wherein the multiplier system is designed to at least one of (i) simultaneously condition primary photons using a beam splitter to different photon energies and (ii) condition a first sub-group of pulses from a sequence of primary photon pulses to a first photon energy, and condition a sub-group of pulses not identical with the first one to a second photon energy.

11. The mass spectrometer according to claim 1, wherein the photons of a specific conditioned energy exiting the multiplier system pass through a delaying device before they are guided to the point along the ion path to arrive there at predetermined timing.

12. Method for operating a mass spectrometer which comprises an ion source, an ion detector, an ion path from the ion source to the ion detector, and a laser system, where a laser cell of the laser system is optically pumped to produce primary photons, and the primary photons pass through a multiplier system to be conditioned to a plurality of different photon energies, of which at least one is higher than an energy of the primary photons, wherein the photons of different photon energies exiting from the multiplier system are each guided to different points along the ion path.

13. The method according to claim 12, wherein the photons of different energies are used for at least one of the vaporization of solid state or liquid molecules with or without their partial ionization, ionization of gaseous molecules, initiation of ion-molecule reactions, photodissociation of ions, separation of ion clusters, desolvation of ions and cleaning of surfaces along the ion path.

* * * * *